(12) United States Patent
King

(10) Patent No.: US 11,131,812 B2
(45) Date of Patent: Sep. 28, 2021

(54) FIBRE CONNECTOR AND METHOD OF ASSEMBLY

(71) Applicant: Boxfish Research Limited, Auckland (NZ)

(72) Inventor: Benjamin Martin King, Surfdale Waiheke Island (NZ)

(73) Assignee: Boxfish Research Limited, Auckland (NZ)

( * ) Notice: Subject to any disclaimer, the term of this patent is extended or adjusted under 35 U.S.C. 154(b) by 10 days.

(21) Appl. No.: 16/666,639

(22) Filed: Oct. 29, 2019

(65) Prior Publication Data

US 2020/0132940 A1   Apr. 30, 2020

(30) Foreign Application Priority Data

Oct. 29, 2018 (NZ) ........................................ 747788

(51) Int. Cl.
*G02B 6/38* (2006.01)
*H01R 13/523* (2006.01)
*H02G 15/013* (2006.01)

(52) U.S. Cl.
CPC ......... *G02B 6/3816* (2013.01); *G02B 6/3849* (2013.01); *G02B 6/3874* (2013.01); *H01R 13/523* (2013.01); *H02G 15/013* (2013.01)

(58) Field of Classification Search
CPC .. G02B 6/3816; G02B 6/3849; G02B 6/3874; G02B 6/4427; H01R 13/523; H01R 13/5219; H01R 13/52; H01G 15/013
See application file for complete search history.

(56) References Cited

U.S. PATENT DOCUMENTS

| | | | |
|---|---|---|---|
| 7,277,614 B2 * | 10/2007 | Cody .................. | G02B 6/3807 385/100 |
| 9,557,493 B2 | 1/2017 | Wu et al. | |
| 2006/0120672 A1 * | 6/2006 | Cody .................. | G02B 6/4472 385/86 |
| 2008/0166093 A1 * | 7/2008 | Shinoski ............. | G02B 6/4427 385/113 |
| 2009/0074367 A1 * | 3/2009 | Shinoski ............. | G02B 6/4427 385/113 |
| 2009/0148104 A1 * | 6/2009 | Lu ....................... | G02B 6/3849 385/72 |

FOREIGN PATENT DOCUMENTS

WO    WO-2017160697 A1 *  9/2017  ........... G02B 6/3849

* cited by examiner

*Primary Examiner* — Thomas A Hollweg
*Assistant Examiner* — Mary A El-Shammaa
(74) *Attorney, Agent, or Firm* — Larson & Anderson, LLC

(57) ABSTRACT

A fibre optic connector is described the fibre optic connector comprising a threaded body; a tether strand spreader; a compression seal, when assembled the compression seal located between the tethered strand spreader and the threaded body; a threaded sealing block, connectable to the threaded body, when assembled forcing the tether strand spreader into the threaded body; a fibre terminator; and an elongated sheath connectable to the threaded body and at least partially covering the fibre terminator.

20 Claims, 11 Drawing Sheets

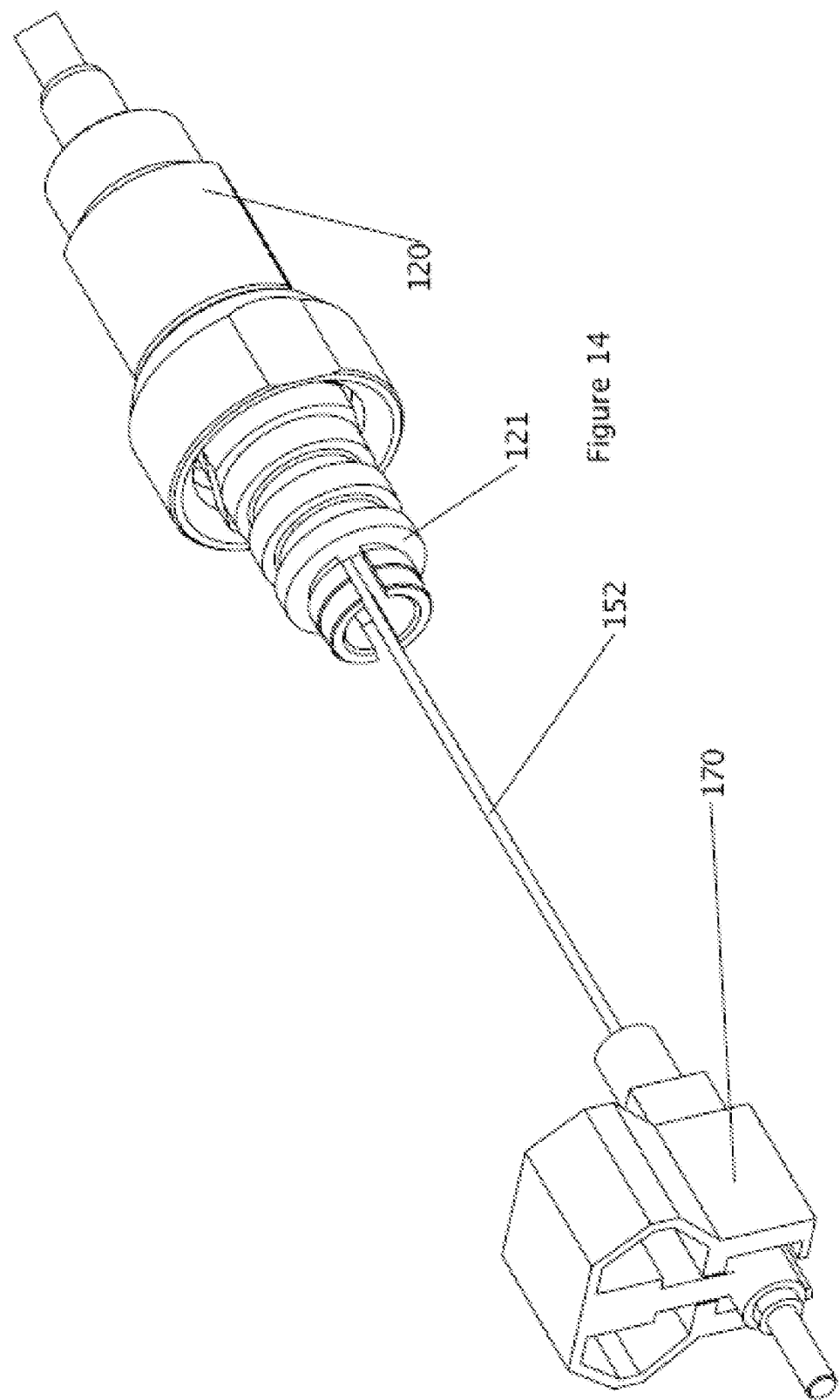

FIBRE CONNECTOR AND METHOD OF ASSEMBLY

CROSS-REFERENCE TO RELATED APPLICATIONS

The present application claims priority to New Zealand Application No. NZ 747788 filed on Oct. 29, 2018 with the Intellectual Property Office of New Zealand, which is incorporated herein by reference in its entirety for all purposes.

FIELD

This invention relates to a Fibre Connector and Method of Assembly.

BACKGROUND

Fibre optic cables are used may be used for communicating with underwater vehicles or other used in other situations requiring a waterproof connector or a totally sealed connector for dust exclusion. Some fibre optic cables include an integral yarn with strands in the manufactured cable that can be used as a tether. It would be desirable to provide a fibre optic connector that secures the tether yarn and yet is easy to assemble in the field without the need for specialist manufacturing equipment.

It is an object of the invention to provide a Fibre Connector and Method of Assembly or to at least provide the public or industry with a useful choice.

SUMMARY

According to one example embodiment there is provided a fibre optic connector comprising:
- a threaded body;
- a tether strand spreader;
- a compression seal, when assembled the compression seal located between the tether strand spreader and the threaded body;
- a threaded sealing block, connectable to the threaded body, when assembled forcing the tether strand spreader into the threaded body;
- a fibre terminator; and
- an elongated sheath connectable to the threaded body and at least partially covering the fibre terminator.

Preferably the fibre optic connector is waterproof when connected.

Preferably the fibre optic connector is dustproof when connected.

Preferably the fibre optic connector further comprises a spacer insertable into the sheath and wherein the fibre terminator is spaced from the threaded body by the spacer.

Preferably the spacer includes a slot for containing the fibre the slot sized to allow the fibre to flex within the slot as the connector is connected.

Preferably the compression seal is made of compressible nylon.

Preferably the compression seal is elongated and has two ends and the compression seal has a hole through the elongated length of the compression seal between the ends through which the fibre cable passes, and wherein when the compression seal is compressed the compression seal compresses on the fibre.

Preferably the ends of the compression seal are cone shaped.

Preferably the threaded body and the tether strand spreader inner cavities are cone shaped and sized to fit the cones of the compression seal.

According to another example embodiment there is provided a method of connecting an optical fibre cable to the sealable connector previously described, the fibre connector having an outer sheath, stranded tethering yarn, an inner sheath and a fibre core, the method comprising:
- passing the threaded sealing block over the outer sheath;
- passing a plurality of heat shrink tubes over the outer sheath;
- passing a ring over the outer sheath;
- passing a collar over the outer sheath;
- removing the outer sheath exposing the stranded tethering yarn and the inner sheath;
- passing the stranded tethering yarn and the inner sheath through the tether strand spreader and folding the stranded tethering yarn back over the tether strand spreader;
- heat shrinking the collar over the stranded tethering yarn to the outer sheath of the fibre optic cable;
- applying at least one layer of heat shrink over the fibre optic cable up to the end of the tether strand spreader;
- moving the ring to the tether strand spreader;
- applying at least one layer of heat shrink over the fibre optic cable up to the ring;
- passing the compression seal over the inner sheath;
- screwing the threaded body and threaded sealing block together thus compressing the compression seal;
- installing a fibre terminator on the fibre cable; and
- screwing the elongated sheath of the sealable connector to the threaded body so as to at least partially cover the fibre terminator.

It is acknowledged that the terms "comprise", "comprises" and "comprising" may, under varying jurisdictions, be attributed with either an exclusive or an inclusive meaning. For the purpose of this specification, and unless otherwise noted, these terms are intended to have an inclusive meaning—i.e., they will be taken to mean an inclusion of the listed components which the use directly references, and possibly also of other non-specified components or elements.

Reference to any document in this specification does not constitute an admission that it is prior art, validly combinable with other documents or that it forms part of the common general knowledge.

BRIEF DESCRIPTION OF THE DRAWINGS

The accompanying drawings which are incorporated in and constitute part of the specification, illustrate embodiments of the invention and, together with the general description of the invention given above, and the detailed description of embodiments given below, serve to explain the principles of the invention, in which:

FIG. 14 is a diagram of a further assembly step assembling the optic fibre connector to an optic fibre cable.

DETAILED DESCRIPTION

Figure 1:
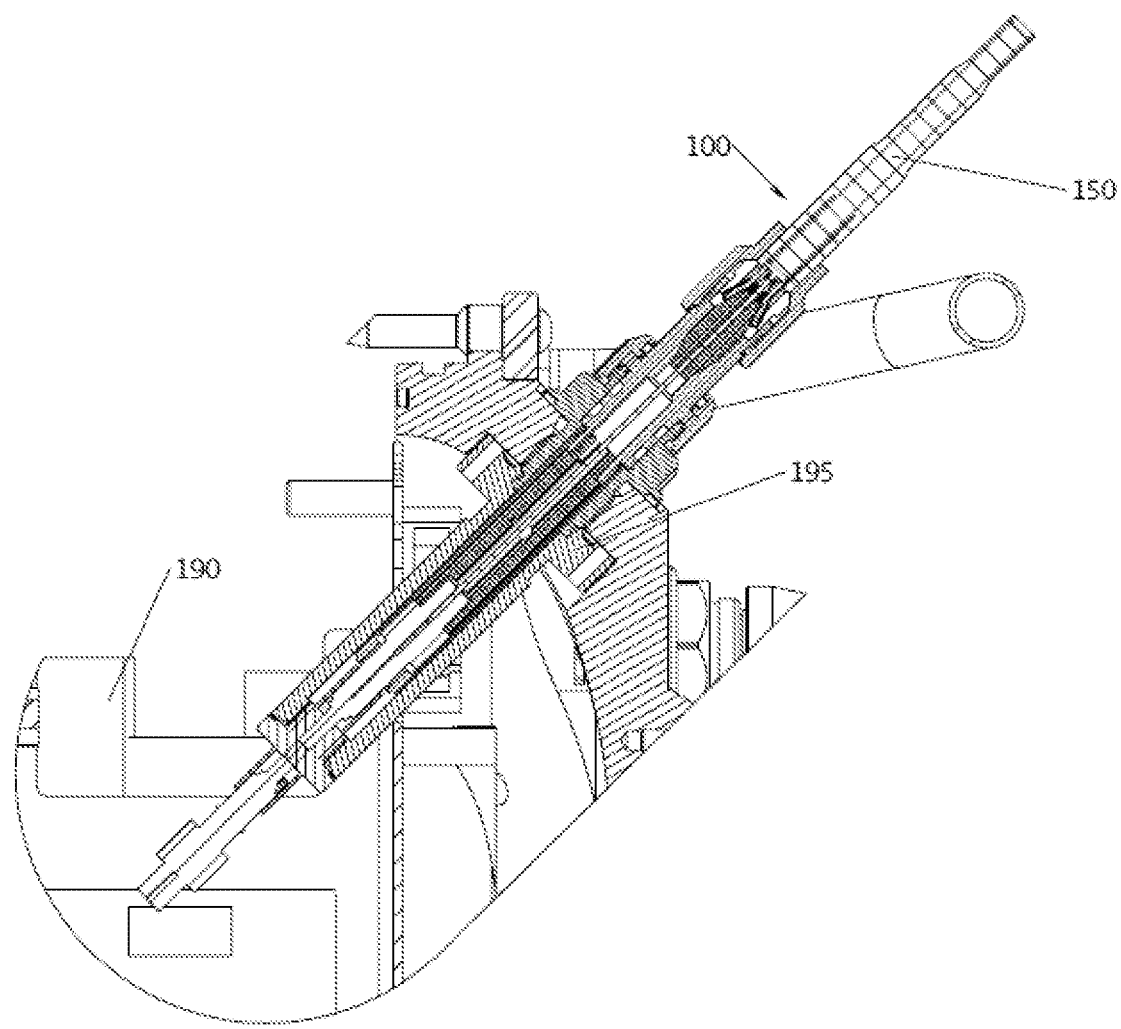
FIG. 1 is a diagram of the fibre optic connector plug connected to an underwater vehicle.
Figure 2:
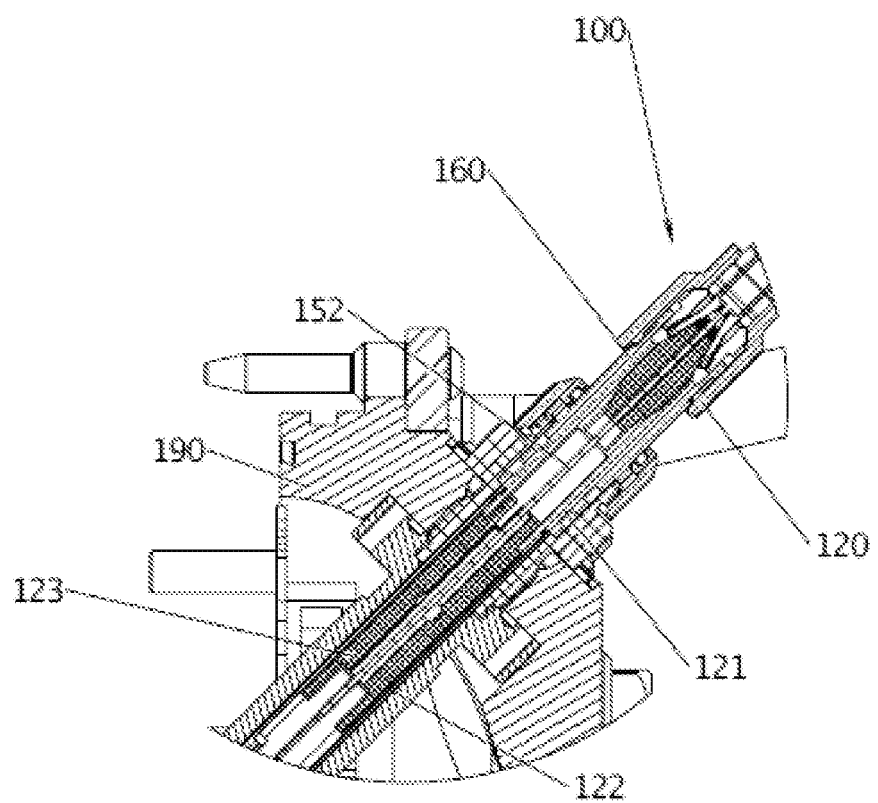
FIG. 2 is a close-up view of FIG. 1.
Figure 3:
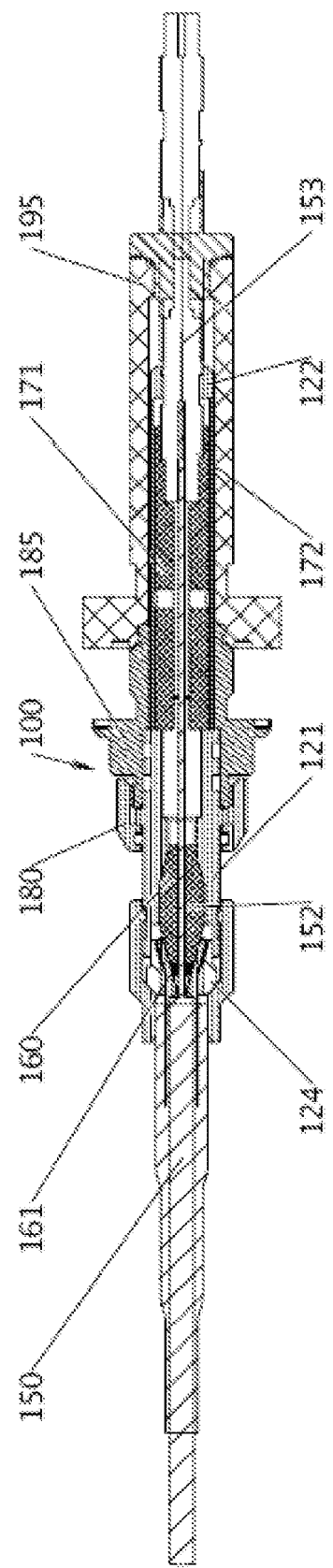
FIG. 3 is a cross section of the fibre optic connector plug and connector socket.
Figure 4:
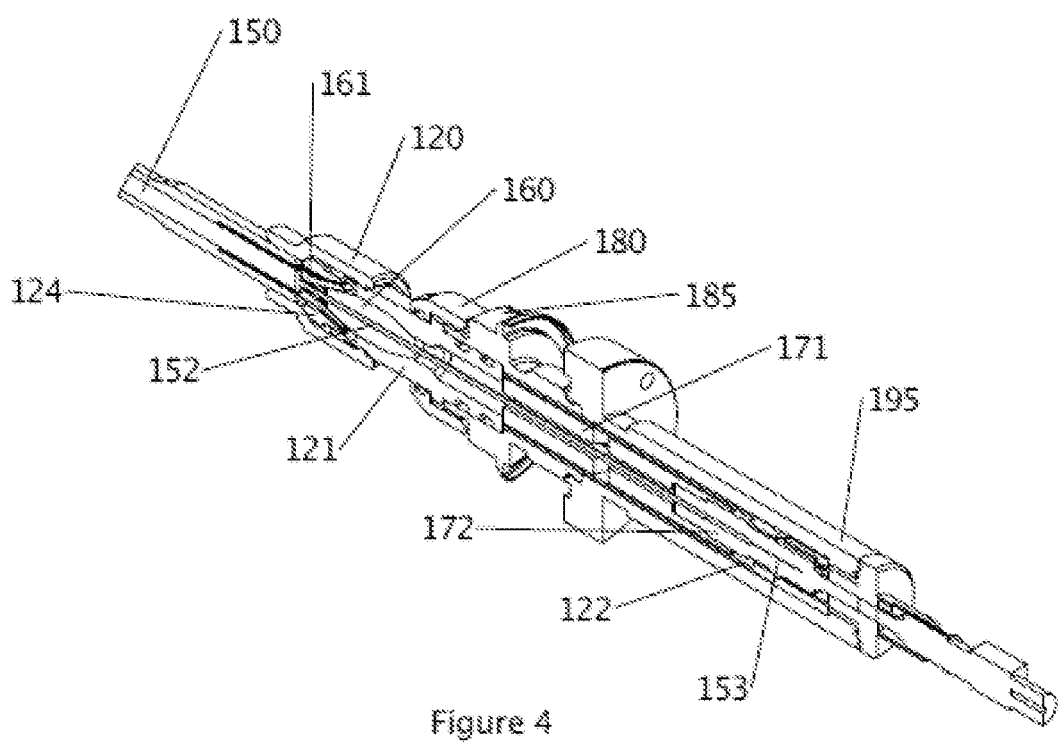
FIG. 4 is a close-up cross section of the fibre optic connector plug and connector socket.
Figure 5:
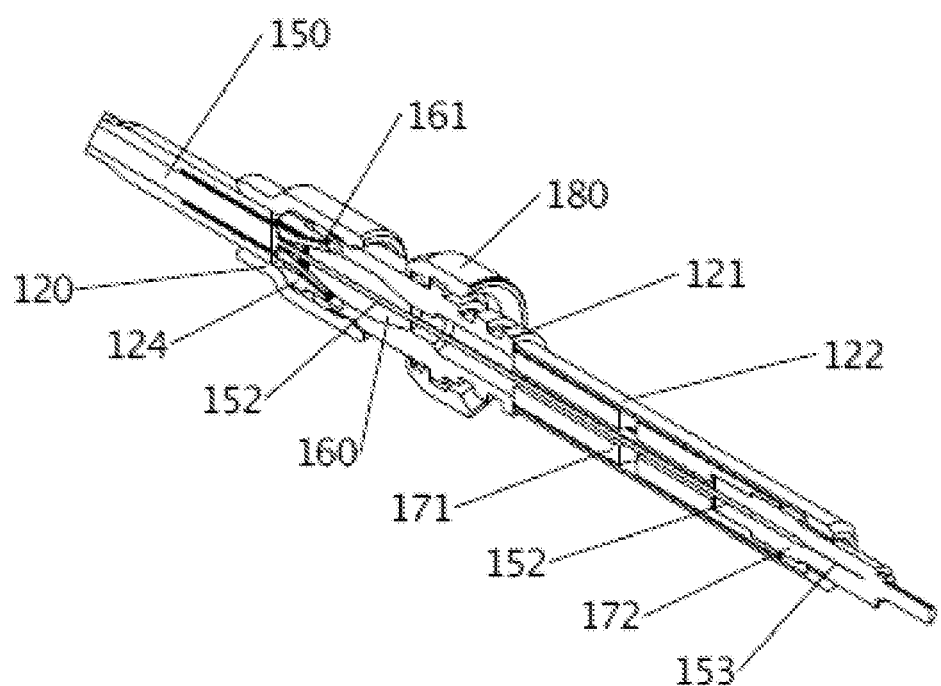
FIG. 5 is a cross section of the fibre optic connector plug.

FIG. 1 illustrates a fibre optic connector 100 and socket 195. Boot 180, 185 may be used between the connector 100 and socket 195. The socket 195 is in one embodiment a fibre socket and tether of an underwater vehicle 190. The socket 195 is in one embodiment watertight and airtight.

Referring to FIG. 1 to 14 the fibre optic cable 150 used with the connector has an outer sheath, tether yarn threads 155 and inner sheath 152 containing an inner fibre core 153. In a preferred embodiment the connector has the same or greater breaking strength as the tether yarn threads.

The fibre optic connector 100 has a threaded body 121, the threaded body 121 has threads and inner cavities.

A tether strand spreader 161 secures the tether yarn threads 155 firstly when the fibre and fibre optic connector 100 are assembled the tether yarn threads 155 are passed back over the tether strand spreader 161 and secondly via a compression seal 160.

The compression seal 160 when the connector is assembled is located between the tether strand spreader 161 and the threaded body 121. Preferably the compression seal is made of compressible nylon.

The compression seal 160 is elongated and has two ends. The compression seal 160 has a hole through the elongated length of the compression seal 160 between the ends through which the fibre cable inner sheath 152 may pass. When the fibre optic connector 100 is assembled the compression seal 160 is compressed and the compression seal 160 compresses on the inner sheath 152 of the fibre optic cable 150.

The ends of the compression seal in one embodiment are cone shaped but other suitable shapes may be used. The threaded body 121 and the tether strand spreader 161 inner cavities match the shape and are sized to fit the compression seal 160. The compression seal 160 may be made of nylon or other compressible plastic. The hole in the compression seal 160 compresses over the inner fibre sheath 152 providing a seal.

A threaded sealing block 120 is connectable to the threaded body 121 and, when assembled forces the tether strand spreader 161 into the threaded body 121.

Thus sealing the fibre optic cable 150 and fibre optic connector 100. The fibre optic connector 100 is waterproof and dustproof when connected.

A field terminable fibre terminator such as a fast connect terminator 172 is used to terminate the fibre core. A spacer 171 is used to suitably space the fast connect terminator 172 within the connector. The spacer 171 includes a slot that allows the fibre core to flex between the compression seal 160 and the fast connect terminator 172.

An elongated sheath 122 is connectable to the threaded body and at least partially covers the fibre terminator (fast connect terminator) 172.

Assembly

Figure 6:
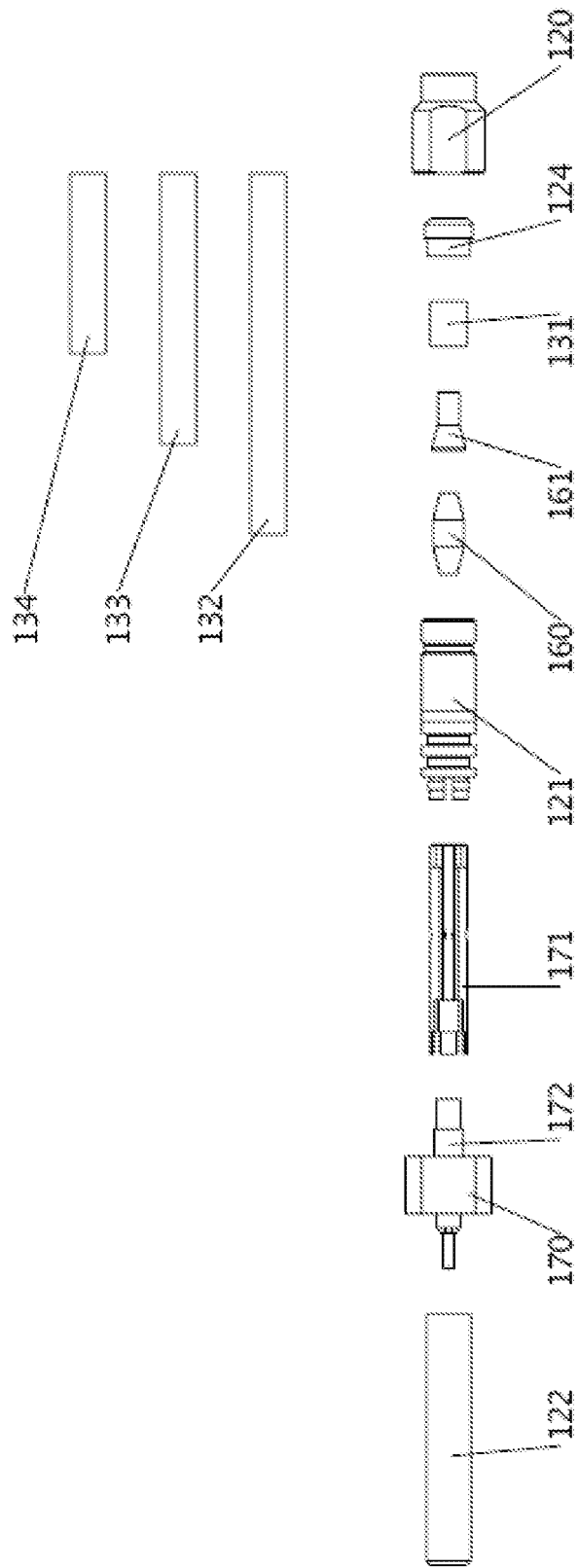
FIG. 6 is a diagram of the assembly components of the fibre optic connector plug.

To assemble the connector the components of the connector are laid out in order as illustrated in FIG. 6. The lengths of each piece of heat shrink are not critical.

Figure 7:
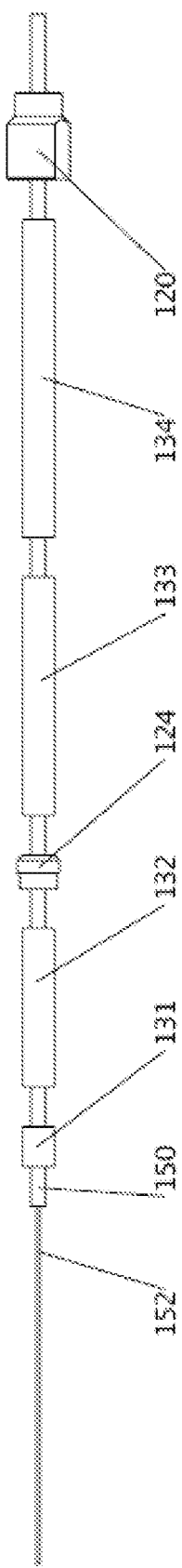
FIG. 7 is a diagram of a further assembly step assembling the fibre optic connector to an optic fibre cable.
Figure 8:
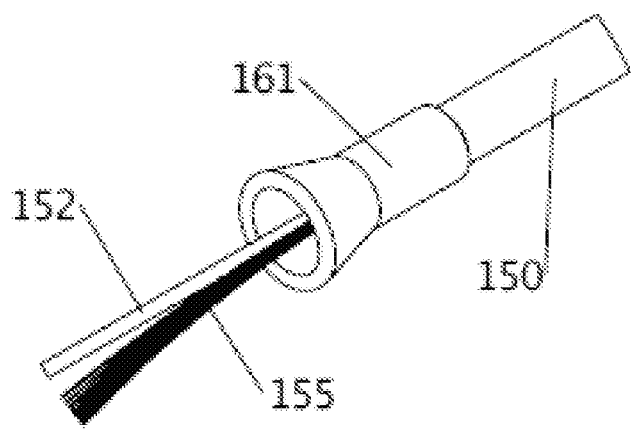
FIG. 8 is a diagram of a further assembly step assembling the fibre optic connector to an optic fibre cable.

The components are then added to the fibre optic cable in reverse order to the order of FIG. 6 as illustrated in FIG. 7.

Approximately 120 mm of the outer jacket of the fibre optic cable is stripped.

Figure 9:
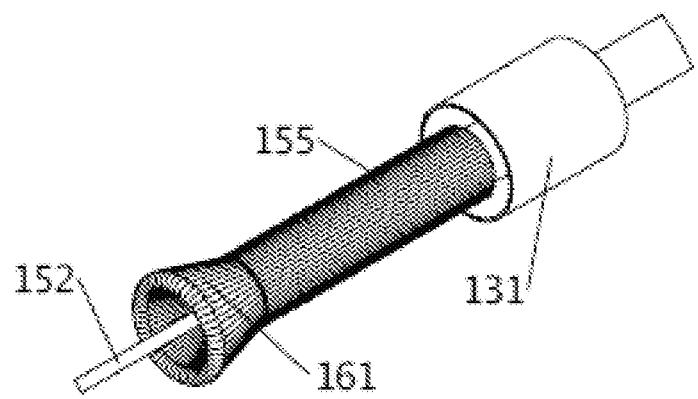
FIG. 9 is a diagram of a further assembly step assembling the fibre optic connector to an optic fibre cable.

The tether yarn threads 155 and the inner fibre sheath 152 are passed through the tether strand spreader 161 and the tether yarn threads 155 are passed back over the tether strand spreader 161. A collar 131 is heat shrunk at approximately 120-150 deg C. air to shrink the collar 131 and the tether yarn threads 155 onto fibre optic cable, just above the strand spreader 161 as seen in FIGS. 9 and 10.

Figure 10:
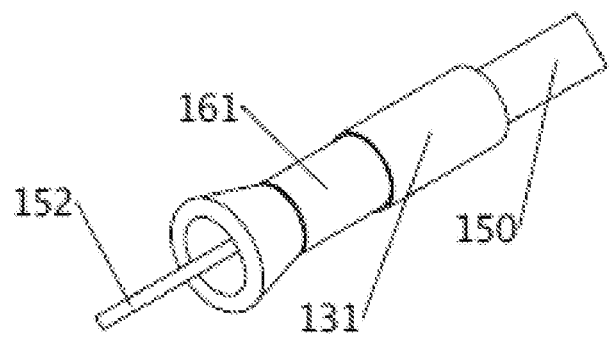
FIG. 10 is a diagram of a further assembly step assembling the fibre optic connector to an optic fibre cable.
Figure 11:
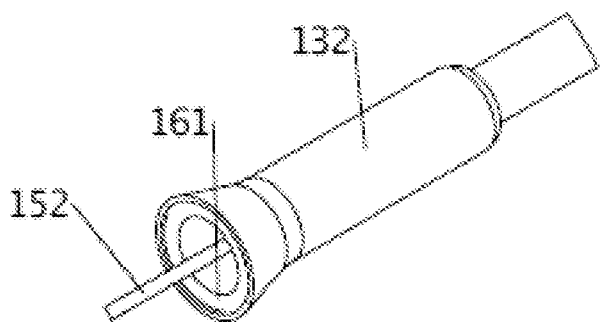
FIG. 11 is a diagram of a further assembly step assembling the fibre optic connector to an optic fibre cable.

The tether yarn threads 155 are then adjusted on the tether strand spreader 161 so that they are evenly distributed as illustrated in FIG. 10. The longest piece of optionally glue lined heat shrink is moved over the collar, tether strand spreader 161 and fibre yarns right up to the end of the tether strand spreader 161 and is heat shrunk.

Figure 12:
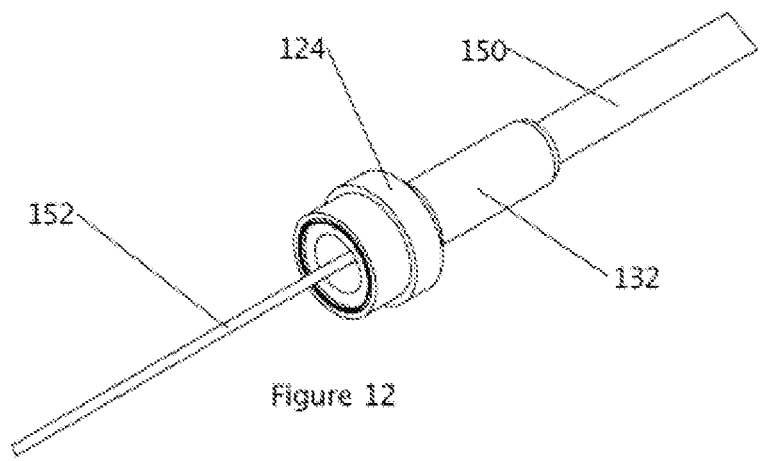
FIG. 12 is a diagram of a further assembly step assembling the fibre optic connector to an optic fibre cable.
Figure 13:
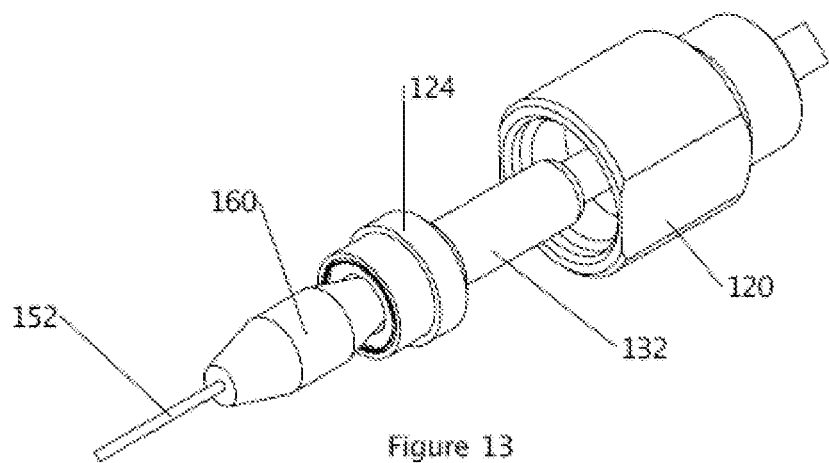
FIG. 13 is a diagram of a further assembly step assembling the fibre optic connector to an optic fibre cable.

A ring 124 made of brass in one embodiment shown in FIG. 12 is then put over the heat shrink, and the medium length heat shrink is moved over the top of the first heat shrink up to the edge of the ring and heat shrunk. The third heat shrink length is moved over the top of the medium heat shrink against the same edge and is heat shrunk.

The compression seal 160 which may be made of nylon is fed on the inner core of the fibre optic cable and the threaded sealing block 120 is moved over the fibre with the heat shrink up to the ring 124 and the threaded body 121 is then passed over the inner core of the fibre optic cable and the threaded body 121 and threaded sealing block 120 are then screwed together. Typically, this would be done with two spanners.

The inner sheathed core 152 of the fibre optic cable is then marked approximately 47 mm from the end of the threaded sealing block 120 on the fibre with a piece of tape. This distance is quite critical. The inner sheathed core 152 is then stripped up to the tape. Advantageously this can be done in 10 to 15 mm at a time.

The fibre connector in one embodiment a fast connect connector including clamp 170 is inserted into an optical fault finder. The fast connect clamp on the fast connect connector is pressed together firmly until it clicks to open the wedge clamp of the connector. The tape marking the fibre is removed and the end of the stripped fibre is cleaned using alcohol and wipe. The fibre cleaver clamp flap is opened and the fibre inserted with the fibre edge of the white sheath (the 47 mm mark) aligned with the 10.5 mm mark on the cleaver. The fibre clamp flap is then closed as is the lid of the cleaver and the slider on the front right of the cleaver is moved until it clicks.

The cleaver is then opened by lifting the bar across the front and the cleaved fibre can be removed. The fast connect terminator 172 is then mounted onto the fibre by threading the fibre into the fast connnect terminator 172 (funnel end) until it stops. Pressure on the fibre when putting into the connector so it maintains a small bend as seen in FIG. 14.

Once the fibre is properly seated, the fast connect clamp is removed. A spacer 171 is inserted between the threaded body 121 block and the fast connect terminator 172, the fast connect terminator 172 clicks into the end of the spacer 171. Finally the sheath 122, preferably made of brass is passed over the fast connect terminator 172 and spacer 171 and screwed to the threaded body 121.

While the present invention has been illustrated by the description of the embodiments thereof, and while the embodiments have been described in detail, it is not the intention of the Applicant to restrict or in any way limit the scope of the appended claims to such detail. Additional advantages and modifications will readily appear to those skilled in the art. Therefore, the invention in its broader aspects is not limited to the specific details, representative apparatus and method, and illustrative examples shown and described. Accordingly, departures may be made from such details without departure from the spirit or scope of the Applicant's general inventive concept.

The invention claimed is:

1. A fibre optic connector comprising:
    a threaded body;
    a tether strand spreader;
    a compression seal, when assembled the compression seal located between the tethered strand spreader and the threaded body;
    a threaded sealing block, connectable to the threaded body, when assembled forcing the tether strand spreader into the threaded body;
    a fibre terminator; and
    an elongated sheath connectable to the threaded body and at least partially covering the fibre terminator.

2. The fibre optic connector of claim 1 wherein the fibre optic connector is waterproof when connected.

3. The fibre optic connector of claim 1 wherein the fibre optic connector is dustproof when connected.

4. The fibre optic connector of claim 1 wherein the fibre optic connector further comprises a spacer insertable into the elongated sheath and wherein the fibre terminator is spaced from the threaded body by the spacer.

5. The fibre optic connector of claim 4 wherein the spacer includes a slot for containing fibre, the slot sized to allow the fibre to flex within the slot as the fibre optic connector is connected.

6. The fibre optic connector of claim 5 wherein the compression seal is elongated and has two ends and the compression seal has a hole through the elongated length of the compression seal between the two ends through which a fibre cable may pass, and wherein when the compression seal is compressed the compression seal compresses on the fibre cable.

7. The fibre optic connector of claim 6 wherein the ends of the compression seal are cone shaped.

8. The fibre optic connector of claim 7 wherein the threaded body and the tether strand spreader inner cavities are cone shaped and sized to fit the cones of the compression seal.

9. The fibre optic connector of claim 8 wherein the fibre optic connector is waterproof and dustproof when connected.

10. The fibre optic connector of claim 4 wherein the compression seal is elongated and has two ends and the compression seal has a hole through the elongated length of the compression seal between the two ends through which a fibre cable may pass, and wherein when the compression seal is compressed the compression seal compresses on the fibre cable.

11. The fibre optic connector of claim 10 wherein the ends of the compression seal are cone shaped.

12. The fibre optic connector of claim 11 wherein the threaded body and the tether strand spreader inner cavities are cone shaped and sized to fit the cones of the compression seal.

13. The fibre optic connector of claim 12 wherein the fibre optic connector is waterproof and dustproof when connected.

14. The fibre optic connector of claim 1 wherein the compression seal is made of compressible nylon.

15. The fibre optic connector of claim 1 wherein the compression seal is elongated and has two ends and the compression seal has a hole through the elongated length of the compression seal between the two ends through which a fibre cable may pass, and wherein when the compression seal is compressed the compression seal compresses on the fibre cable.

16. The fibre optic connector of claim 15 wherein the ends of the compression seal are cone shaped.

17. The fibre optic connector of claim 16 wherein the threaded body and the tether strand spreader inner cavities are cone shaped and sized to fit the cones of the compression seal.

18. The fibre optic connector of claim 15 wherein the fibre optic connector is waterproof and dustproof when connected.

19. A method of connecting an optical fibre cable to a sealable connector, the method comprising:
    passing a threaded sealing block of the sealable connector over an outer sheath of the optical fibre cable;
    passing a plurality of heat shrink tubes of the sealable connector over the outer sheath;
    passing a ring of the sealable connector over the outer sheath;
    passing a collar of the sealable connector over the outer sheath;
    removing the outer sheath exposing a stranded tethering yarn and inner sheath of the optical fibre cable;
    passing the stranded tethering yarn and the inner sheath through a tether strand spreader of the sealable connector and folding the stranded tethering yarn back over the tether strand spreader;
    heat shrinking the collar over the stranded tethering yarn to the outer sheath of the fibre optic cable;
    applying a least one of the plurality of heat shrink tubes over the fibre optic cable up to an end of the tether strand spreader;
    moving the ring to the tether strand spreader;
    applying a least one of the plurality of heat shrink tubes over the fibre optic cable up to the ring;
    passing a compression seal of the sealable connector over the inner sheath;
    passing a threaded body of the sealable connector over the inner sheath and screwing the threaded body and the threaded sealing block together thus compressing the compression seal;
    installing a fibre terminator of the sealable connector on a fibre core of the optical fibre cable; and
    screwing an elongated sheath of the sealable connector to the threaded body so as to at least partially cover the fibre terminator.

20. A method of connecting an optical fibre cable to the sealable connector of claim 19, the method further comprising passing a spacer of the sealable connector over the inner sheath before passing the threaded body over the inner sheath.

* * * * *